Sept. 27, 1938. P. HAAS 2,131,280
ADJUSTMENT FOR OPTICAL SYSTEMS
Filed Feb. 15, 1936
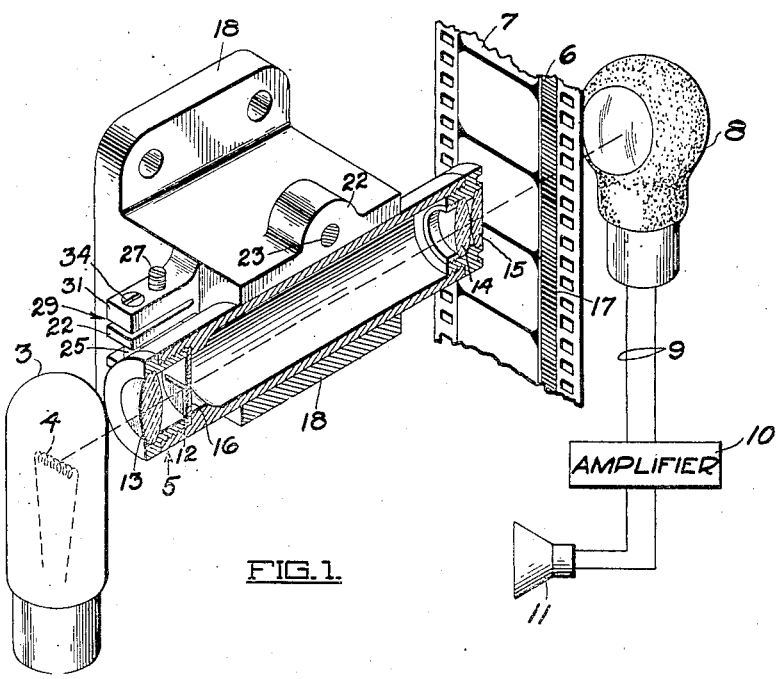
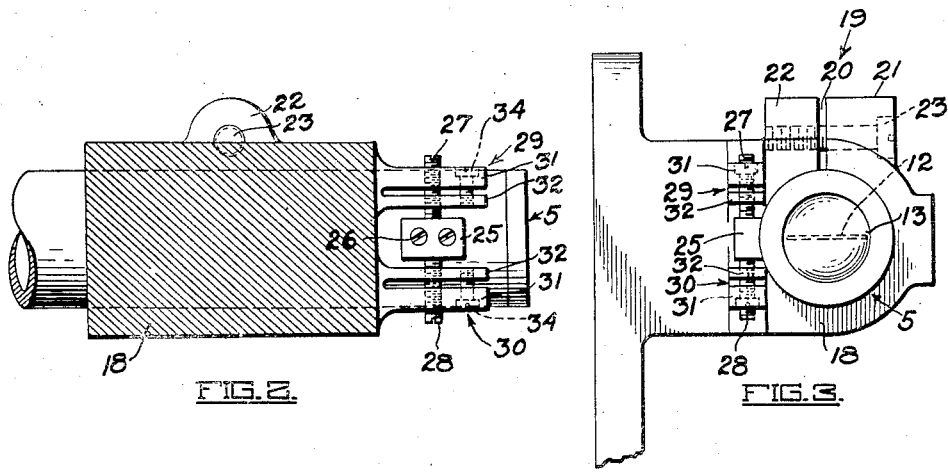
INVENTOR.
PAUL HAAS
BY
ATTORNEY Patented Sept. 27, 1938

2,131,280

UNITED STATES PATENT OFFICE 2,131,280

ADJUSTMENT FOR OPTICAL SYSTEMS

Paul Haas, Glendale, Calif., assignor to United Research Corporation, Burbank, Calif., a corporation of Delaware Application February 15, 1936, Serial No. 64,106

3 Claims. (Cl. 88—24)

This invention relates to sound recording and reproducing through the use of a photographic sound record and more particularly to the adjustment of the optical system for focusing a narrow line of light upon the sound record.

In both recording and reproducing sound from a photographic sound film a beam of light in the form of a very fine line is focused upon the film at the sound track with its length extending transversely of the travel of the film. In recording, this line of light is made to expose the photosensitive film and in this case the intensity of the line of light may be made to vary in accordance with the amplitude of the sound being recorded, as in the variable density type, or the length of the line of light, measured transversely of the film travel, may be made to vary in accordance with the amplitude of the sound, as in the variable area type of recording. In reproduction this line of light is generally kept at a constant intensity and constant length and is changed either in intensity or in length by the sound record on the film. However, in practically all cases, this line of light is produced by passing a beam of light through a very fine slit or narrow aperture, lenses being employed before and/or after the slit to focus the line of light upon the film.

Since the line of light should be of the order of .001" or less in width and approximately .084" in length, it is not only necessary that it be accurately focused but also properly oriented with respect to the position of the film or sound track. That is, the adjustment of the azimuth of the light line must be under vernier control together with a locking means which does not disturb the adjustment. The above applies to all recording and reproducing of sound of which the variable area and variable density types are the most notable examples.

The present invention is directed to the adjustment of the slit forming member about an axis coaxial with the beam of light passing therethrough, and has for an object to adjust and lock the slit forming member in a desired position.

This is accomplished by rotatably supporting the slit member in a support. Preferably the slit member is incorporated in a lens tube which in turn is rotatably held in the support. A lug attached to the tube and movable with respect to projections from the support is adapted to be engaged and moved by adjusting screws threadably held by the projections. The projections may consist of separated pairs, one projection of each pair being semi-flexible. Means in the form of clamp or lock screws through the projections are provided for flexing the flexible projections, thus producing sufficient friction between the threads of the adjusting screws and the threaded portions engaged thereby to firmly lock the adjusting screws in any desired position. The locking or clamping screws are so set that very little movement thereof is required to accomplish the locking of the adjusting screws, the locking operation thereby not disturbing the adjustment.

For further details of the invention, reference may be had to the accompanying drawing, wherein:

Fig. 1 is a perspective view, partly in section, of a sound reproducing device embodying my invention.

Fig. 2 is a sectional view taken along the line 2—2 of Fig. 1 and showing the azimuth adjustment of the lens tube.

Fig. 3 is a front view of the lens tube and its support and is taken in the direction of the arrow 3 of Fig. 2.

Referring now to Fig. 1, an exciter lamp 3 having a rectilinear filament 4 displaced in a horizontal position projects a beam of light through a lens tube generally indicated at 5, from whence it is focused upon the sound track portion 6 of a motion picture film 7 which is adapted to be moved in a vertical direction at a constant speed by any well known sound film driving means (not shown). A light sensitive device such as a caesium or potassium cell 8 is provided behind the film 7 so as to receive the beam of light modulated by the sound track portion 6 and to generate an electric current varying directly in accordance with the modulated beam of light. The currents generated by cell 8 are passed through leads 9 into an amplifier diagrammatically indicated at 10 and thence into a loud speaker 11. The sound track portion 6 of film 7 is shown as being of the variable density type wherein the sound is recorded as vertically spaced horizontal striations 17 whose opacity varies with the instantaneous volume of the sound recorded and whose center distances are determined by the frequency. However, the track 6 may be of the variable area type wherein the volume of the sound is determined by the amount of opacity across the width of the track.

In employing either a variable area or variable density type of sound track, the light from the exciter lamp 3 is focused upon the film 7 in the form of an extremely narrow horizontal line of light. This is accomplished by means of a slit 12 formed by a slit member 16 within the tube 5 which co-acts with a condenser lens 13 and a pair of objective lenses 14 and 15. Especially in the case of variable density records, it is absolutely essential that the line or slit of light falling upon the sound track portion of the film be parallel to the horizontal striations upon the sound track. The importance of this will be realized when considering the fact that at higher frequencies, say 9,000 cycles per second, the width of a single striation which corresponds to one half wavelength, becomes on the order of about .001 inch or less.

Referring now to Figs. 2 and 3, I will describe the means for adjusting the line of light focused upon the film and which forms the main embodiment of my invention. A lens support or holder 18 is provided which may be suitably secured upon the wall or casing (not shown) of the sound reproducing device. Tube 5 is mounted in a split sleeve arrangement 19 provided in the front of support 18. Bosses 21 and 22, are integrally formed upon the support 18 on either side of a slit 20. Clamp screw 23 passing through boss 21 and threadably secured in the rear boss 22 is provided to clamp the lens tube 5 in any position after adjustment.

Tube 5 has a lug 25 secured to the circumference thereof as by screws 26 and is adapted to be engaged on the opposite sides thereof by a pair of set screws 27 and 28. Screws 27 and 28 are threadably secured in pairs of projections 29 and 30 respectively, extending from the main body of the support 18. Each pair of projections comprises a relatively stiff projection 31 and a more or less flexible projection 32, both of which are preferably formed integral with the support 18. However, it is obvious that one or both of the projections 31 and 32 may be formed separately and secured as by means of suitable screws to the side of support 18. Clamp or lock screws 34 pass through the end of each projection 31 and are threadably secured within the inner flexible projection 32. Although the flexible projections 32 are shown as being interposed between the rigid projection 31 and the lug 25, it is obvious that these projections may be placed on the outside of the rigid projections 31.

In adjusting the tube 5 so that the line of light imaged by the slit 12 falls upon the sound track 6 exactly parallel to the horizontal striations, the clamp screws 34 are tightened sufficiently to put a considerable friction upon the threads of either of the screws 27 and 28 by means of the flexing of the projections 32. This pressure, however, is not so great that it will prevent turning of either of set screws 27 and 28. When the azimuth of tube 5 is accurately located the clamp screws are required to be rotated only slightly to frictionally lock both the screws 27 and 28 in their final adjusted position. There is no tendency therefore to change the relative positions of the screws 27 and 28 and disturb their adjustment.

Either after, during, or preferably before the azimuth adjustment, the tube 5 is focused by moving it to or from the film until a clear and sharp image of the slit 12 is formed thereon. After the lens has been adjusted for both focus and azimuth alignment the clamp screw 23 may be tightened without affecting either adjustment.

Having thus described the invention, what is claimed as new and desired to secure by Letters Patent, is:

1. In an optical system for a sound reproducing apparatus, a lens tube, a support for said tube, a slit forming member in said tube, and an azimuth adjusting means for said tube comprising, a lug on the circumference of said tube, a pair of substantially rigid projections on said support, screws threadably mounted in said projections for engaging opposite sides of said lug and adapted to adjust the azimuth of said tube, the ends of said screws contacting said lug being substantially flat flexible projections on said support adjacent each of said first mentioned projections, said screws being threaded through said flexible projections, and clamp screws passing through said rigid projections and threaded into said flexible projections.

2. In a sound reproducing apparatus consisting of a lens tube for focusing a beam of light upon a photographic sound record moving across the axis of said tube, a slit in said member for converging said beam into a narrow line of light, a support for said tube, and means for adjusting the azimuth of said tube comprising, a lug on the circumference of said tube, a pair of projections on said support adjacent one side of said lug, a second pair of projections adjacent the opposite side of said lug, a set screw threaded through each pair of projections and adapted to engage each of said opposite sides of said lug, the contact ends of said set screws being substantially flat, and means on each pair of said projections for flexing one projection relative to the other projection, said means comprising a screw threaded into one projection of each pair and contacting the other projection of each pair.

3. In a sound reproducing apparatus consisting of a lens tube for focusing a beam of light upon a photographic sound record moving across the axis of said tube, a slit in said member for converging said beam into a narrow line of light, a support for said tube, and means for adjusting the azimuth of said tube comprising, a lug on the circumference of said tube, a pair of projections on said support adjacent one side of said lug, a second pair of projections adjacent the opposite side of said lug, one projection of each of said pairs being relatively flexible, a set screw threaded through each of said pairs and having a substantially flat contact surface with said lug and means on each pair of said projections for flexing each of said flexible projections to lock said set screws in position.

PAUL HAAS.